(12) United States Patent
Symietz et al.

(10) Patent No.: US 6,965,008 B2
(45) Date of Patent: Nov. 15, 2005

(54) POLYURETHANE REACTIVE COMPOSITION

(75) Inventors: Detlef Symietz, Wangen (CH); Daniel Schneider, Au (CH); Paul Rohrer, Herrliberg (CH)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/744,523

(22) Filed: Dec. 22, 2003

(65) Prior Publication Data

US 2005/0137376 A1    Jun. 23, 2005

(51) Int. Cl.⁷ .............................................. C08G 18/80
(52) U.S. Cl. .............................. 528/56; 528/45; 528/55
(58) Field of Search ............................... 528/45, 55, 56

(56) References Cited

U.S. PATENT DOCUMENTS

| | | | |
|---|---|---|---|
| 4,788,083 A | 11/1988 | Dammann et al. | 427/340 |
| 5,574,123 A | 11/1996 | Bock et al. | 528/45 |
| 5,756,634 A | 5/1998 | Braunstein et al. | 528/45 |
| 6,258,918 B1 | 7/2001 | Ho et al. | 528/66 |

FOREIGN PATENT DOCUMENTS

| | | | |
|---|---|---|---|
| WO | 9600754 | 1/1996 | C08L 75/04 |

OTHER PUBLICATIONS

Derwent Abstract, EP62780; Blum et al., 198285987E, Oct. 1982.
Derwent Abstract, EP431414, Grogler et al., 1991-172761, Jun. 1991.
Derwent Abstract, EP598873, Abend, 1994007471, Jun. 1994.
Derwent Abstract, EP103323, Groegler et al., 1984-050098, Mar. 1984.

*Primary Examiner*—Rachel Gorr

(57) ABSTRACT

The invention relates to a polyurethane reactive composition comprising an isocyanate, an isocyanate reactive polymeric compound and a catalyst for the reaction of the isocyanate with the isocyanate reactive compound. The isocyanate reactive compound is a diol or a higher functional polyol of a polyester, of a polyester polyurethane, of a polycarbonate or of a mixture thereof, the polyester being derived from a hydroxy carboxylic acid or from its corresponding lactone, and the catalyst is a sterically hindered bismuth compound.

19 Claims, 2 Drawing Sheets

POLYURETHANE REACTIVE COMPOSITION

FIELD OF INVENTION

The present invention relates to a heat-curable polyurethane reactive composition comprising an isocyanate, an isocyanate reactive compound and a catalyst for the reaction of the isocyanate with the isocyanate reactive compound an adhesive comprising said composition a polyurethane obtained by heat-curing, as well as processes for the preparation of the heat-curable polyurethane reactive composition.

BACKGROUND OF INVENTION

Heat-curable polyurethane reactive compositions are one-component compositions, which can be cured by heating to result in a polyurethane. They comprise an isocyanate and a diol or a higher functional (meaning having more than two functional groups) polyol as an isocyanate reactive compound. Polyurethane reactive compositions allow simple manufacture of composites such as building panels and laminates, crash padding for vehicles, and reinforced structures in boats and aircrafts. They can be used as adhesives, sealing compositions, coating compositions, embedding compositions and the like. The use of polyurethane reactive compositions as adhesives is of particular interest, for example, in the automotive industry. EP-B-0062780 and EP-B-0103323 disclose the use of suspensions of solid isocyanates, which have been deactivated by superficial polyadduct formation.

EP-B-0598873 describes a polyurethane reactive composition comprising a tertiary amine or an organometallic compound as a catalyst in order to enhance the reaction rate.

A polyurethane reactive composition comprising a polyether polyol and a polyester polyol is known from EP-A-0431414.

Conventionally, the diols or higher functional polyols used in polyurethane reactive compositions are hydroxyl-terminated polyethers. Such polyethers are inexpensive and easy to handle. On the other hand, polyether polyurethanes are known to have low mechanical properties. For demanding applications where stringent mechanical requirements must be satisfied, polyurethane reactive composition comprising polyester diols or polyols yielding polyester polyurethanes are used.

Polyester polyurethanes show higher tensile strengths than polyether polyurethanes. However, polyester polyurethanes are known to show poor hydrolysis resistance. In applications where the polyurethane yielded is exposed to humidity, polyester polyurethanes are not suitable.

Epoxy resins usually show a higher hydrolysis resistance than conventional polyester polyurethanes. Further, epoxy resins often show a tensile and a lap shear strength superior to the tensile and lap shear strenght of conventional polyester polyurethanes. Due to these advantages, epoxy resins are often preferred to conventional polyurethane reactive compositions. However, cured epoxy resins are brittle. Their elongation at break is low. In applications where the performance of the material under static as well as under dynamic load is of importance, the impact resistance of cured epoxy resins is often unsatisfying. The application of epoxy resins on an e-coated substrate, for example in the automotive industry, is not suitable because of its low elongation at break and the poor impact resistance. It is therefore highly desirable to have a product, which combines a high elongation at break with a high tensile and lap shear strength and a good hydrolysis resistance.

What is needed is a polyurethane reactive composition which after curing yields a polyurethane having particularly high tensile and lap shear strength values, a high elongation at break and a good hydrolysis resistance.

SUMMARY OF INVENTION

According to the present invention, this problem is solved by a heat-curable polyurethane reactive composition comprising an isocyanate, an isocyanate reactive compound and a catalyst for the reaction of the isocyanate with the isocyanate reactive compound wherein the isocyanate reactive compound is a diol or a higher functional polyol of a polyester, of a polyester polyurethane, of a polycarbonate or of a mixture thereof, the polyester being derived from a hydroxy carboxylic acid or from the corresponding lactone, and the catalyst is a sterically hindered bismuth compound.

The term "a mixture thereof" as used herein means a mixture of one or more of any of the given components.

BRIEF DESCRIPTION OF DRAWINGS

The polyurethane reactive composition according to the present invention yields a polyurethane having an extraordinary tensile strength of more than 17 MPa and lap shear strength on an e-coated substrate of more than 14 MPa. Said polyurethane shows an elongation at break of more than 300%.

It has surprisingly been found that the polyurethane yielded from the polyurethane reactive composition according to the present invention has a significantly enhanced hydrolysis resistance. Therefore the composition of the present invention gives excellent results when used in applications which are exposed to humidity. The above tensile properties, i.e., a tensile strength of more than 17 MPa, a lap shear strength on an e-coated substrate of more than 14 MPa, an elongation at break of more than 300%, are reached even after an exposure of seven days to 95% relative humidity at 70° C. followed by an exposure of 16 hours at −40° C. and 2 hours at room temperature. On e-coated substrates, the impact resistance of the polyurethane yielded by the composition of the present invention surpasses the impact resistance of epoxy resins. The lap shear failure mode of the polyurethanes on e-coated steel shows without exception a fracture in the polyurethane, the e-coat or the steel substrate even after an exposure of seven days to 95% relative humidity at 70° C. followed by an exposure of 16 hours at −40° C. and 2 hours at room temperature.

The polyurethane reactive composition according to the present invention results in a cured product which combines the desired properties of a conventional polyurethane with the high tensile strength and hydrolysis resistance of epoxy resins as well as with a high elongation at break. The composition according to the present invention is particularly useful in applications which are exposed to humidity and on which both static and dynamic loads are exerted, e.g., as adhesive in applications of the automotive industry.

Additionally, the polyurethane reactive compositions according to the present invention show a relatively narrow curing peak with a temperature difference between the upper end and the lower end of the curing peak of less than 30° C., as measured in a Differential Scanning Calorimeter at a heating rate of 10° C./minutes. The narrow curing range allows the curing reaction to be fast and well controlled.

Figure 1:
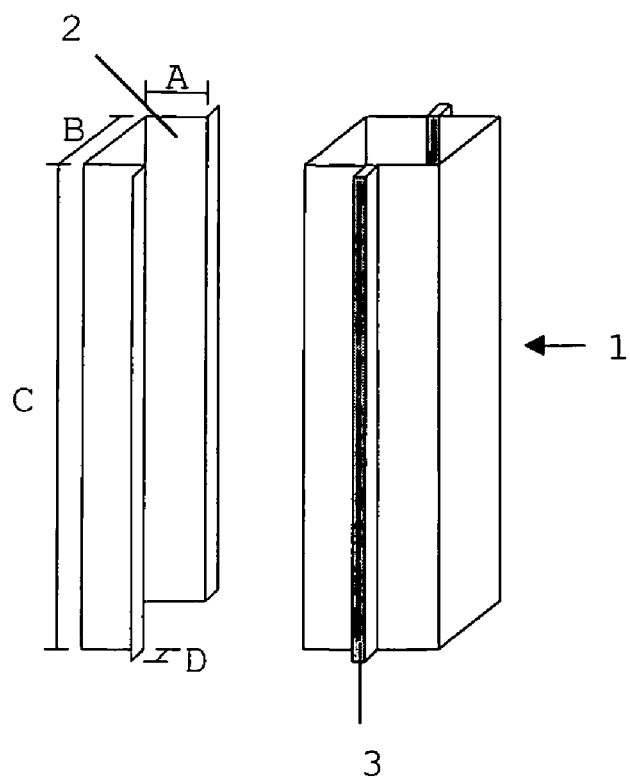

FIG. 1 illustrates a box beam used in a free fall impact crash test.

Figure 2:
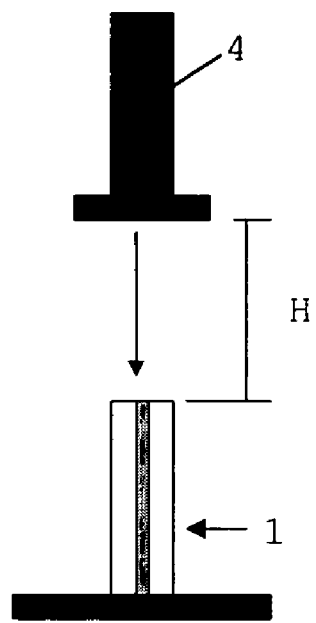

FIG. 2 illustrates the test arrangement for a free fall impact test.

Figure 3:
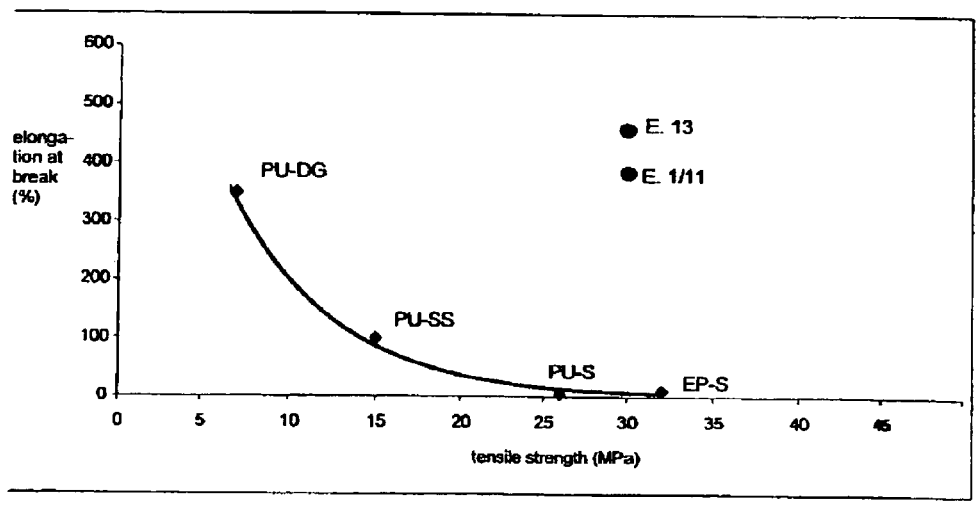

FIG. 3 illustrates the elongation at break versus the tensile strength for various adhesives including the invention.

Figure 4:
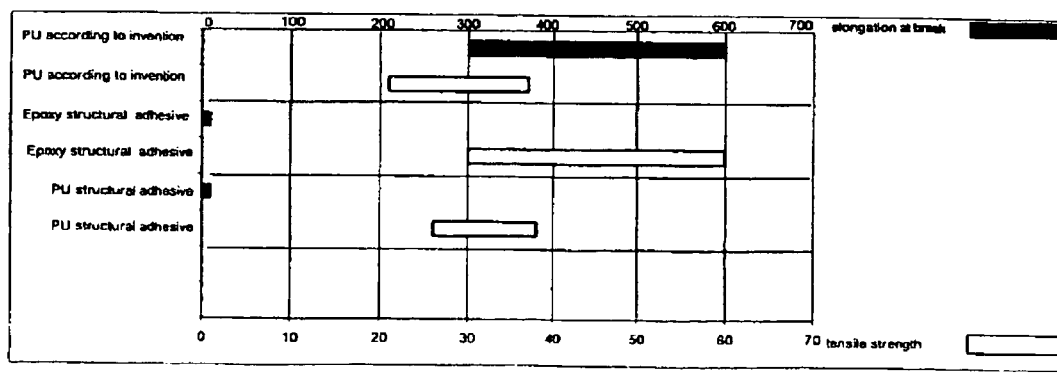

FIG. 4 illustrates the elongation at break and tensile strengths of various adhesives including adhesives of the invention.

DETAILED DESCRIPTION OF THE INVENTION

In one aspect of the invention, the heat-curable polyurethane reactive composition comprises a solid surface-deactivated isocyanate, an isocyanate reactive polymeric compound and a catalyst for the reaction of the isocyanate with the isocyanate reactive compound wherein the isocyanate reactive compound is a diol or a polyol of a polyester or a polycarbonate or a mixture thereof, the polyester being derived from a hydroxy carboxylic acid or from its corresponding lactone, and the catalyst is a sterically hindered bismuth compound.

Such a composition is generally thermoplastic and solid at room temperature. It is stable at room temperature and therefore can be stored easily.

In a thermoplastic polyurethane reactive composition comprising in addition to a solid polyester polyol a liquid diol or a higher functional polyol of a polycarbonate, the "pop-off-effect", i.e., the commonly observed problem that the uncured composition springs off the substrate when cooled down after the application, is significantly reduced.

In a preferred embodiment, the polyurethane reactive composition comprises in addition to a solid thermoplastic polyester polyol a diol or a higher functional polyol of a polycarbonate in an amount of at least 30%, preferably at least 50% by weight of the total polyol. Preferable polyester polyols include polycaprolactones, polybutyrol acetones, polyvalerolactones or mixtures thereof.

Example for the isocyanate reactive compound according to the present invention are polycaprolactone diols having an average molecular weight of 200–20000, preferably 1000–4000, and most preferably 2000, polycarpolactone triols having an average molecular weight of 200–20000, preferably 1000–9000, γ-polybutyrolactone diols having an average molecular weight of 200–20000, preferably 1000–4000, most preferably 2000, γ-polybutyrolactone triols having an average molecular weight of 200–20000, preferably 1000–9000, δ-polyvalerolactone diols having an average molecular weight of 200–20000, preferably 1000–4000, most preferably 2000, δ-polyvalerolactone triols having an average molecular weight of 200–20000, preferably 1000–9000, polycarbonate diols having an average molecular weight of 200–20000, preferably 1000–4000, and most preferably 2000, and polycarbonate triols having an average molecular weight of 200–20000, preferably 1000–9000.

Suitable isocyanates are known to a person skilled in the art. Examples are toluenediisocyanate and isophoronediisocyanate. In an embodiment wherein the isocyanate is a solid surface-deactivated isocyanate, the isocyanate is preferably an urea or uretdion of toluenediisocyanate.

When preparing a composition with a solid surface-deactivated isocyanate, a solid isocyanate is deactivated by a compound having at least two primary amino groups, preferably a primary, sterically unhindered diamine or triamine or mixture thereof, more preferably by a polymeric primary diamine. Suitable polymeric primary diamines are Jeffamin D-400 (Huntsmann, polyoxyalkylene diamine MW 400), Jeffamin D-230 (Huntsmann, polyoxyalkylene diamin MW 230), Jeffamin ED-600 (Huntsmann, polyoxyalkylene diamine MW 600). Further suitable diamines are N,N'-bis (3-aminopropyl)-ethylene diamine, ethylene diamine, 1,3-propylene diamine, 1,4-butylene diamine, neopentylene diamine, 1,5-diamino-2-methyl-pentane, 1,7-diaminoheptane, 1,8-diaminooctane, 1,9-diaminononane, 1,10-diaminodecane, 4,7-dioxadecan-1,10-diamine, 4,9-dioxadodecane-1,12-diamine, 4,7,10-trioxatridecane-1,13-diamine, 4,4-diaminodicyclohexylmethane, 3,3-dimethyl-4,4-diaminodicyclohexylmethane, 4,4-diaminodiphenylmethane, diamino-m-xylene, diamino-p-xylene, isophorondiamine, 1,2-diaminohexane, 4,4-diamino-diphenylether, 1,8-diaminonaphthaline, 2,3-diaminotoluene. Further, triamines such as diethylene triamine, 1,5,11-triaminoundecane, Jeffamin T-403 (polyoxyalkylene triamine MW 400), 3-(2-aminoethyl)aminopropylamine, tripropylene triamine, 4-aminoethyl-1,8-diaminooctan, tetraamines such as triethylene tetramine, and hexamines such as penta-ethylenehexaamine can be used for deactivation of the solid isocyanate by encapsulation.

In a preferred embodiment, the catalyst is a sterically hindered bismuth-compound in a concentration of 0.05%–0.5% as related to the bismuth-content. The sterically hindered bismuth catalyst is preferably bismuth-neodecanoate. It is further preferred that the composition comprises a sterically hindered antimony compound. Another suitable catalyst is a sterically hindered zirconium compound such as zirconium-neodecanoate.

Suitable additives are known to the person skilled in the art. They include stabilizers such as a polymeric primary triamine, fillers such as carbon black, calcium carbonate and clay, desiccants such as a molecular sieve, adhesion promoters such as amino or epoxy silanes, rheological additives such as fumed silica, low molecular isocyanate reactive extenders, plasticizers and the like.

In a further, particularly preferred embodiment of the present invention, the composition is a liquid in the form of a suspension, wherein the isocyanate is a solid surface-deactivated isocyanate, and the isocyanate reactive compound is a diol or a higher functional polyol of a polyester polyurethane.

The term "liquid" as used herein includes liquids of any viscosity which are pumpable at room temperature, i.e., also pastes.

The liquid compositions according to the present invention do not show a melting endotherm or do show it at temperatures below room temperature when analysed by Differential Scanning Calorimetry by heating from −40° C. at a rate of 10° C./min.

Said stable, liquid composition can be easily applied without melting on a substrate at room temperature and stays on the substrate without fixing. Due to the fact that the composition is liquid at room temperature, no "pop off effect" is observed.

In such a liquid composition, the number average molecular weight of the polyester polyurethane preferably is from 1500 Da to 3000 Da. The polyester polyurethane is preferably obtainable by reacting a polycaprolactone diol or polyol with an asymmetric diisocyanate. In such an embodiment, the number average molecular weight of the polycaprolactone diol or polyol preferably is from 500 Da to 1500 Da. The asymmetric diisocyanate is preferably toluenediisocyanate or isophoronediisocyanate or a mixture thereof. It is further preferred that the ratio of the hydroxyl groups of the polycaprolactone diol or polyol to the isocyanate groups of the asymmetric diisocyanate is from 1.2 to 3, more preferably from 1.5 to 2.5.

Due to the above desirable characteristics, i.e. easy appliance at room temperature, absence of "pop off effect", an adhesive comprising such a liquid composition is preferred.

Further, an adhesive comprising a thermoplastic composition and a liquid composition is preferred. Such an adhesive, also designated a "quick fix composition", has very low shrinkage and "pop-off" characteristics.

The above adhesives are particularly useful for the bonding of metal to glass, e.g. in hinges and mounting studs, or for the bonding of roof modules to vehicle bodies, since no stress is applied to the glass substrate after application of the adhesive. The above adhesives are also particularly useful for the bonding of engineering polymers, more particularly polycarbonate blends.

By the following method, stable polyurethane reactive compositions are achieved:

A diol or a higher functional polyol of a polyester or of a polycarbonate or a mixture thereof is provided as an isocyanate reactive compound, the polyester being derived from a hydroxy carboxylic acid or from the corresponding lactone and being in its liquid form, and a compound having at least two primary amino groups is added thereto. Then, a solid isocyanate is added. Finally, a mixture comprising the isocyanate reactive compound and a sterically hindered bismuth-catalyst is added. Particularly stable polyurethane reactive compositions are achieved if a mixture comprising the isocyanate reactive compound and the compound having two or more amino groups is added after adding the solid isocyanate. In a preferred embodiment, a polymeric primary triamine is added before adding the mixture comprising the isocyanate reactive compound and the sterically hindered bismuth-catalyst.

EXAMPLES

Examples 1 to 10

A polyurethane reactive composition according to the present invention was prepared as follows:

Premix: A premix was prepared by melting 173.25 g of polycaprolactone diol MW 2000 (TONE 1241, DOW) at 60° C. in a laboratory planet mixer, and admixing 72.19 g of dry carbon black (Printex 30, Degussa), 22.79 of dry molecular sieve 3A (Purmol 3A, Chemische Fabrik Uetikon), and 5.25 g of a catalyst (see list below). The mixture was degassed at 60° C. and 20 mbar for 30 minutes.

Preparation of heat-curable polyurethane reactive composition: 83.62 g of polycaprolactone diol MW 2000 (TONE 1241, DOW) were melted at 60° C. in a laboratory planet mixer, and 3.50 g of Jeffamin D-400 (polyoxyalkylene diamine) were admixed at 60° C. and 1013 mbar during 5 minutes. 47.92 g of dimeric 2,4-toluenediisocyanate (Metalink U, Acima) was then admixed at 60° C. and 1013 mbar for 10 minutes and 25.74 g of a mixture comprising 4.82% of polyoxyalkylene diamine in melted polycaprolactone diol MW 2000 was admixed thereafter at 60° C. and 1013 mbar during 5 minutes under nitrogen. 6.90 g of polyoxyalkylene triamine MW 5000 (Jeffamine T-5000, Huntsman) were added during 10 minutes at 60° C. and 20 mbar. Finally, 182.32 g of the premix were admixed at 60° C. and 20 mbar for 20 minutes.

Catalysts (see premix)

Catalyst according to the invention:
1. Bismuth-neodecanoat (Neobi 200, Shepherd)

Control Examples:
2. Bismuth-octoate (Chem. Fabrik Uetikon)
3. Bismuth-carboxylate—Mix. (BiCat VM, Shepherd)
4. Dibutyltin dilaurate (Fluka)
5. Dibutyltin diacetate (Fluka)
6. Dibutyltin dicarboxylate (UL-8 Witco)
7. Zinc-neodecanoate (BiCat ZM, Shepherd)
8. Cobalt-neodecanoate (NeoCo 205PR, (9% in Toluol) Shepherd)
9. Cobalt-octoate (OctCo 120XL, Shepherd)
10. Dimorpholinodiethylether (DMDEE, Chem. Fabrik Schweizerhalle)

For the testing, the compositions were filled into cartridges and heated above the softening temperature of the thermoplastic composition and extruded onto a substrate as given in Tables 1, 2 and 3.

The tensile strength, the lap shear strength and the elongation at break under different conditions after curing were determined. For determination of the modulus and the elongation at break, dumbbell samples were prepared according to DIN method 53 504. Lap shear strength of samples of 2 mm thickness was measured according to method EN 1465 at a speed of 10 mm/minutes. The results are given in Table 1.

TABLE 1

| Catalyst | Tensile strength a. 7 d RT(*)/(MPa) | Elongation at break a. 7 d RT(*)/(%) | Tensile strength a. 7 d Cata()/(MPa) | Elongation at break a. 7 d Cata()/(%) | Lap shear strength on e-coat after 7 d RT(*)/(MPa) | Lap shear strength on e-coat a. 7 d Cata(**)/(MPa) | Rreaction-peak by DSC/(° C.) | Curing-range by DSC/(° C.) |
|---|---|---|---|---|---|---|---|---|
| 1 (according to invention) | 29.8 | 389 | 21.8 | 399 | 19.0 | 17.9 | 111 | 101–126 |
| 2 (reference) | 23.2 | 339 | 23.0 | 343 | 15.0 | 10.4 | 111 | 104–122 |
| 3 (reference) | 26.8 | 370 | 20.3 | 367 | 16.9 | 11.7 | 108 | 101–118 |
| 4 (reference) | 29.1 | 410 | 0.1 | — | 20.2 | 0.7 | 111 | 101–123 |
| 5 (reference) | 16.2 | — | decomposed | decomposed | 14.9 | decomposed | 109 | 102–121 |

TABLE 1-continued

| Catalyst | Tensile strength a. 7 d RT(*)/(MPa) | Elongation at break a. 7 d RT(*)/(%) | Tensile strength a. 7 d Cata()/(MPa) | Elongation at break a. 7 d Cata()/(%) | Lap shear strength on e-coat after 7 d RT(*)/(MPa) | Lap shear strength on e-coat a. 7 d Cata(**)/(MPa) | Rreaction-peak by DSC/(° C.) | Curing-range by DSC/(° C.) |
|---|---|---|---|---|---|---|---|---|
| 6 (reference) | 21.6 | 450 | decomposed | decomposed | 18.9 | decomposed | 102 | 81–119 |
| 7 (reference) | not stable (cured in cartridge after 1 day at RT) | | | | | | 94/122 | 82–200 |
| 8 (reference) | 14.9 | 195 | 16.8 | 231 | 11.7 | 8.4 | 113 | 99–153 |
| 9 (reference) | 18.6 | 276 | 18.9 | 312 | 13.0 | 12.7 | 102 | 89–145 |
| 10 (reference) | 23.7 | 400 | 19.4 | 419 | 14.3 | 11.0 | 121 | 101–185 |

(*)measured for the cured sample after seven days of aging at 23° C. and 50% relative humidity
(**)measured for the cured sample after 7 days of aging at 23° C. and 50% relative humidity followed by 7 days at 70° C. and 95% relative humidity followed by 16 hours at −40° C. and 2 hours at room temperature

Examples 11 to 19

Premix 1: Premix 1 was prepared by mixing (x)g of component A and (x)g of component B in a laboratory planet mixer at high mixing speed during 5 minutes under nitrogen (definition of components and values of (x): see lists below).

Premix 2: Premix 2 was prepared by mixing (x)g of component A (and (x)g of component A1 as in Example 15), (x)g of component E, (x)g of component F and (x)g of component G were mixed in a laboratory planet mixer at 20 mbar for 30 minutes (definition of components and values of (x): see lists below).

Preparation of heat-curable polyurethane reactive composition: (x)g of component A and (x)g of component B were homogenized in a laboratory planet mixer under nitrogen at 1013 mbar during 5 minutes. (x)g of component C were then homogenised under nitrogen at 1013 mbar for 10 minutes and (x)g of premix 1 were admixed during 5 minutes. (x)g of component D were admixed thereto at 20 mbar for 10 minutes. Finally, (x)g of premix 2 were admixed thereto at 20 mbar for 20 minutes.

Component B: Jeffamin D-400 (polyoxyalkylene diamine MW 400)
Component C: Metalink U (dimeric 2,4-toluene diisocyanate)
Component D: Jeffamin T-5000 (polyoxyalkylene triamine MW 5000)
Component E: Printex 30 (carbon black)
Component F: Purmol 3A (molecular sieve 3 A)
Component G: Neobi 200 (Bismuth-neodecanoate)

Example According to the Invention

Example 11

Component A: Tone 1241 DOW, (polycaprolactone diol (1,4-butanediol initiated) 2000 MW)

Example 12

Component A: TONE 0240 DOW, (polycaprolactone diol (diethyleneglycol initiated) 2000 MW)

Example 13

Component A: Ravecarb 107, Enichem, (polycarbonate diol (dimethylcarbonate based) 1850 MW)

Reference Examples

Example 14

Component A: Dynacoll 7360, Degussa Hüls, (polyesterdiol (1.6-dihydroxyhexane, adipic acid based) 3500 MW)

Example 15

Component A: TONE 2241 DOW, (polycaprolactone diol (neopentylenglycol initiated) 2000 MW Component A1: Tegomere H5002 Goldschmidt, (polyacrylate polyol (several different acrylates) MW 467)

Example 16

Component A: Desmophen 1800 Bayer, (slightly branched polyester polyol MW 944)

Example 17

Component A: Desmophen 1652 Bayer, (linear polyester polyol MW 1063)

Example 18

Component A: Desmophen 1700 Bayer, (linear polyester polyol MW 1308)

Example 19

Component A: Acclaim 2200 Lyondell, (PO-polyether diol MW 2000) mixing temperature: solid (thermoplastic) polyols: 60° C. liquid polyols: 40° C.

|  | Ex. 11 g | Ex. 12 g | Ex. 13 g | Ex. 14 g | Ex. 15 g | Ex. 16 g | Ex. 17 g | Ex. 18 g | Ex. 19 g |
| --- | --- | --- | --- | --- | --- | --- | --- | --- | --- |
| premix 1 | | | | | | | | | |
| component A | 36.75 | 36.75 | 36.75 | 36.75 | 35.44 | 36.75 | 36.75 | 36.75 | 36.75 |
| component B | 1.86 | 1.86 | 1.86 | 1.86 | 2.21 | 1.86 | 1.86 | 1.52 | 1.86 |
| premix 2 | | | | | | | | | |
| component A | 173.25 | 173.25 | 163.96 | 209.84 | 70.93 | 173.25 | 173.25 | 173.25 | 173.25 |
| component A1 | — | — | — | — | 96.23 | — | — | — | — |
| component E | 72.19 | 72.19 | 72.19 | 78.75 | 69.62 | 84.00 | 72.19 | 84.00 | 72.19 |
| component F | 22.79 | 22.79 | 36.75 | 26.25 | 21.95 | 26.15 | 22.79 | 26.51 | 22.79 |
| component G | 5.25 | 5.25 | 5.25 | 5.25 | 5.04 | 5.25 | 5.25 | 5.25 | 5.25 |
| mixture | | | | | | | | | |
| component A | 83.62 | 83.62 | 80.50 | 70.00 | 80.71 | 73.50 | 83.62 | 83.62 | 83.62 |
| component B | 3.50 | 3.50 | 3.50 | 3.50 | 4.24 | 3.50 | 3.50 | 2.81 | 3.50 |
| component C | 47.92 | 47.92 | 47.92 | 30.45 | 57.40 | 47.92 | 47.92 | 38.50 | 47.92 |
| premix 1 | 25.74 | 25.74 | 25.74 | 25.74 | 25.10 | 25.74 | 25.74 | 25.52 | 25.74 |
| component D | 6.90 | 6.90 | 6.90 | 6.90 | 6.72 | 6.90 | 6.90 | 6.90 | 6.90 |
| premix 2 | 182.32 | 182.32 | 185.43 | 213.40 | 175.84 | 192.43 | 182.32 | 192.68 | 182.32 |
| total: | 350 | 350 | 350 | 350 | 350 | 350 | 350 | 350 | 350 |

By the following process, stable liquid polyurethane reactive compositions are achieved:

A diol or a higher functional polyol of a liquid polyester polyurethane is provided as an isocyanate reactive compound. Said polyester polyurethane having two or more functional hydroxy groups is obtainable by reacting a polyester diol or polyol with an asymmetric diisocyanate. The polyester diol or polyol, which the polyester polyurethane is based on, is preferably polycaprolactone diol or polyol. More preferably, the polycaprolactone diol or polyol has a number average molecular weight of from 500 Da to 1500 Da.

Then, a solid isocyanate is added. Finally, a mixture comprising the isocyanate reactive compound and the sterically hindered bismuth-catalyst is added.

The following Examples 20 and 21 both relate to a process for the preparation of a liquid polyurethane reactive composition according to the present invention.

Examples 20 and 21

The following liquid prepolymers A and B have been prepared as follows:

a) Preparation of prepolymer A (stoichiometric ratio of polycaprolactone diol to isophoronediisocyanate: 2:1)

435.01 g TONE 32C8 (1,6-hexanediol initiated polycaprolactone diol, MW 750, DOW), 0.50 g Bi-neodecanoate (NeoBi200, Shepherd) and 64.49 g isophoronediisocyanate are fed into a lab reactor and mixed and heated under nitrogen for 120 min at 80° C. to give a polycaprolactone-polyurethane free of NCO-groups. The resulting prepolymer has the following properties: liquid at room temperature, number average molecular weight=1720 (calculated from OH titration).

b) Preparation of prepolymer B (stoichiometric ratio of polycaprolactone diol to toluenediisocyanate: 3:2)

432.45 g TONE 32C8 (1,6-hexanediol initiated polycaprolactone diol, MW 750, DOW), 0.66 g Bi-neodecanoate (NeoBi200, Shepherd) and 66.89 g toluenediisocyanate are fed into a lab reactor and mixed and heated under nitrogen for 120 min at 80° C. to give a polycaprolactone-polyurethane free of NCO groups. The resulting prepolymer has the following properties: liquid at room temperature, number average molecular weight=2600 (calculated from OH titration).

As a comparative Example, solid prepolymer C has been prepared using a symmetric isocyanate.

c) Preparation of prepolymer C (stoichiometric ratio of polycaprolactone diol to hexylenediisocyanate: 2:1)

449.00 g TONE 32C8 (1,6-hexanediol initiated polycaprolactone diol, MW 750, DOW), 0.65 g Bi-neodecanoate (NeoBi200, Shepherd) and 50.35 g 1,6-hexylenediisocyanate are fed into a lab reactor and mixed and heated under nitrogen for 120 minutes at 80° C. to give a polycaprolactone-polyurethane free of NCO groups. The resulting prepolymer has the following properties: solid, crystalline at room temperature, number average molecular weight=1670 (calculated from OH titration).

Example 20

A premix is made by mixing 169.05 g prepolymer A as obtained under a), 70.40 g carbon black (Printex 30, Degussa), 22.21 g molecular sieve 3A and 5.25 g Bi-neodecanoate (NeoBi200, Shepherd) in a planetary mixer under vacuum (20 mbar) for 30 minutes at 60° C. Then, the polyurethane reactive composition is made in a planetary mixer as follows: 81.59 g prepolymer as obtained under a) and 4.10 g Jeffamine D-400 (polyoxyalkylenediamine, MW 400, Huntsman) are mixed at 50° C. for 5 minutes. 54.30 g Metalink U (urethion of 2,4-toluylenediisocyanate, Acima) are then admixed for 10 minutes under nitrogen and at high speed, still at 50° C. Then, 25.37 g of a solution of 6.15% Jeffamine D-400 in the prepolymer A as obtained under a) are added under nitrogen and at high speed. Thereafter, the pressure in the mixture is reduced from ambient to 20 mbar, and 6.72 g Jeffamine T-5000 (polyoxyalkylene triamine, MW 5000, Huntsman) are admixed at moderate stirring for 10 min at 50° C. Finally, 177.92 g of the above premix are added and mixed for 20 minutes. The pressure is brought back to ambient and a liquid, highly viscous polyurethane reactive composition is obtained.

Example 21

A premix is made by mixing 180.02 g prepolymer B as obtained under b), 74.97 g carbon black (Printex 30, Degussa), 22.00 g molecular sieve 3A and 5.25 g Bi-neodecanoate (NeoBi200, Shepherd) in a planetary mixer under vacuum (20 mbar) for 30 minutes at 60° C. Then, the polyurethane reactive composition is made in a planetary mixer as follows: 86.89 g prepolymer as obtained under a) and 3.15 g Jeffamine D-400 (polyoxyalkylenediamine, MW 400, Huntsman) are mixed at 50° C. for 5 min. 38.50 g Metalink U (urethion of 2,4-toluylenediisocyanate, Acima) are then admixed for 10 minutes under nitrogen and at high speed, still at 50° C. Then, 26.15 g of a solution of 2.75% Jeffamine D-400 in the prepolymer B as obtained under b) are added under nitrogen and at high speed. Thereafter, the pressure in the mixture is reduced from ambient to 20 mbar, and 7.14 g Jeffamine T-5000 (polyoxyalkylene triamine, MW 5000, Huntsman) are admixed at moderate stirring for 10 min at 50° C. Finally, 188.17 g of the above premix are added and mixed for 20 minutes. The pressure is brought back to ambient and a liquid, highly viscous polyurethane reactive composition is obtained.

The tensile strength, the lap shear strength and the elongation at break under different conditions after curing were determined. The results are given in Table 2.

Example 22

The adhesive obtained from example 11 is used for bonding a clevis or mounting stud to a quarter glass of a car. The stud is used as a support for a latching element. The glass is first primed on its bonding face with Betaprime 435.26 (glass primer of Dow Automotive) and let dry for 4 hours at standard conditions. The clevis is made of steel and its round base plate of 40 mm diameter is coated with a phenolic resin to be bonded onto. The bonding face is cleaned with acetone before application of the adhesive. The 60° C. warm adhesive is extruded onto the plate and the clevis is quickly mated with the primed section of the glass and fixed so that the adhesive layer has a thickness of 1 mm.

The adhesive is cured through electromagnetic induction, using a coil shaped to the dimensions of the clevis. In the curing cycle the adhesive is heated for 10 seconds to 80° C., kept 30 seconds at that temperature, heated for 20 seconds to 150° C. and held at that temperature for 2 minutes and then let cool down.

The material is tested for adhesion under load after one day at ambient temperature. The spring test fixture is connected to the threaded top of the stud and a pulling load of 100 kg is exerted. The assembly is placed in a 95° C. circulating air oven and the time to failure is noted if failure occurs before the testing period of 2 days. The adhesive did not fail within 48 hours at 95° C.

TABLE 2

| Example | Tensile strength a. 7 d RT(*)/(MPa) | Elongation at break a. 7 d RT(*)/(%) | Tensile strength a. 7 d Cata()/(MPa) | Elongation at break a. 7 d Cata()/(%) | Lap shear strength a. 7 d RT(*)/(MPa) | Lap shear strength a. 7 d Cata(**)/(MPa) | melting peak/(° C.) | curing peak/(° C.) |
|---|---|---|---|---|---|---|---|---|
| 11 (acc. to invention) | 29.8 | 389 | 21.8 | 399 | 19.0 | 17.9 | 51 | 111 |
| 12 (acc. to invention) | 26.2 | 402 | 19.0 | 392 | 19.4 | 16.3 | 51 | 113 |
| 13 (acc. to invention) | 29.7 | 471 | 19.8 | 401 | 20.0 | 16.8 | — | 109 |
| 14 (reference) | 13.3 | 391 | 6.7 | — | 19.1 | 4.1 | 59 | 105 |
| 15 (reference) | 13.9 | 163 | 9.7 | 148 | 10.4 | 8.7 | 48 | 114 |
| 16 (reference) | 8.6 | 118 | 6.0 | 135 | 9.9 | 3.6 | — | 113 |
| 17 (reference) | 22.3 | 983 | 2.5 | 545 | 16.7 | 2.5 | — | 112 |
| 18 (reference) | 19.3 | 545 | 1.6 | 393 | 14.0 | 0.9 | — | 114 |
| 19 (reference) | — | — | — | — | 7.8 | 5.6 | — | 123 |
| 20 (acc. to invention) | 33.1 | 429 | 19.0 | 498 | 17.4 | 15.1 | — | 102 |
| 21 (acc. to invention) | 32.3 | 509 | 18.0 | 506 | 20.3 | 16.2 | — | 94 |

In Table 3, the failure modes of examples 11 to 19 in the lap shear testing are given.

TABLE 3

| | Failure mode in lap shear strength on e-coat | |
|---|---|---|
| | 7d RT(*) | 7d Cata(**) |
| Example 11 | 75% cf/25% e-coat | 20% cf/80% e-coat |
| Example 12 | 55% cf/45% e-coat | 85% cf/15% e-coat |
| Example 13 | 50% steel/50% e-coat | 45% cf/55% e-coat |
| Example 14 | 60% cf/40% af | 100% af |
| Example 15 | 100% cf | 95% cf/5% af |
| Example 16 | 100% cf | 35% cf/65% af |
| Example 17 | 35% cf/50% steel/15% af | 100% af |
| Example 18 | 75% cf/25% e-coat | 50% cf/50% bf |
| Example 19 | 100% cf | 80% cf/20% af | cf: cohesive failure in cured material
steel: fracture in steel
e-coat: fracture in e-coat
bf: boundary failure (fracture near interface)
af: adhesive failure Impact Test Performance:

The compositions of examples 1 and 13 were tested regarding their crash resistance. Galvanized e-coated steel plates were put together forming a so called box beam by use of the corresponding composition as adhesive. The box beam was submitted to a "free fall impact" crash test. After a given impact weight hit the box beam with a given speed, the deformation after impact was determined. FIG. 1 shows a so called box beam (1), i.e., two steel plates (2) put together by an adhesive (3). The dimensions of the steel plate (2) are as follows: A=22.5 mm, B=46 mm, C=200 mm, D=15 mm. The thickness of the steel plate (2) is 0.62 mm, and the thickness of the adhesive (3) is 1 mm. FIG. 2 shows a test arrangement with a box beam (1) and an impact weight (4). The height of free fall (H) is 5 m or 8 m, respectively. The results are given in Table 4.

TABLE 4

|  |  |  | H = 5 m free fall | | | H = 8 m free fall | | |
| --- | --- | --- | --- | --- | --- | --- | --- | --- |
|  | adhesive thickness | storage after cure | deformation after impact (%) | G* | bond failure | deformation after impact (%) | G | bond failure |
| Ex. 1 | 1 mm | RT | 43.0 | 58.1 | no | 65.5 | 61.1 | no |
| Ex. 1 | 1 mm | Cataplasma | 36.0 | 69.4 | no | — | — | — |
| Ex. 13 | 1 mm | RT | 32.0 | 78.1 | no | 51.0 | 78.4 | no |
| heat structural EP adhesive | 0.2 mm | RT | total destruction | | | total destruction | | |

*G = deceleration

|  | impact weight | impact speed | impact energy |
| --- | --- | --- | --- |
| free fall | 33.3 kg | 35.7 km/h | 1633 J |
| free fall | 33.3 kg | 45.1 km/h | 2613 J |

The elongation at break and the tensile strength of Examples 1, 11 and 13 were plotted in a graph and compared to the elongation at break and the tensile strength of conventional epoxy resins and conventional polyurethanes. FIG. 3 illustrates that the polyurethanes (PU) yielded after curing of the composition according to the present invention shows a high elongation at break combined with a tensile strength in the range of a tensile strength of an epoxy resin (EP). The abbreviations in FIG. 3 have the following meanings:

PU-DG: Polyurethane for direct glazing with high modulus

PU-SS: semi-structural polyurethane

PU-S: structural polyurethane

EP-S: structural epoxy resin

E. 1/11: examples 1/11

E. 13: example 13

The combination of a high elongation at break with a high tensile strength of the polyurethanes yielded by curing of the composition according to the present invention is further illustrated in FIG. 4.

What is claimed is:

1. A heat-curable polyurethane reactive composition comprising an isocyanate, an isocyanate reactive compound and a catalyst for the reaction of the isocyanate with the isocyanate reactive compound wherein the isocyanate reactive compound is a diol or a higher functional polyol of a polyester, of a polyester polyurethane, of a polycarbonate or of a mixture thereof, the polyester being derived from a hydroxy carboxylic acid or from the corresponding lactone, and the catalyst is a sterically hindered bismuth compound wherein the composition is thermoplastic and solid at room temperature.

2. A heat-curable polyurethane according to claim 1 wherein the isocyanate is a solid surface-deactivated isocyanate.

3. A composition according to claim 2 wherein the solid surface-deactivated isocyanate is an urea or uretdion of toluene diisocyanate.

4. A composition according to claim 3 comprising a solid surface-deactivated isocyanate, which is surface-deactivated by a primary, sterically unhindered diamine or triamine or a mixture thereof.

5. A composition according to claim 1 wherein the polyester is a polycaprolactone, a polybutyrolactone, a polyvalerolactone or a mixture thereof.

6. A composition according to claim 1 wherein the composition is thermoplastic and solid at room temperature and comprises in addition to thermoplastic polyester, a liquid diol or a higher functional polyol of a polycarbonate in the amount of at least 30% by weight based on the weight of total polyol.

7. A heat-curable polyurethane reactive composition comprising an isocyanate, an isocyanate reactive compound and a catalyst for the reaction of the isocyanate with the isocyanate reactive compound wherein the isocyanate reactive compound is a diol or a higher functional polyol of a polyester, of a polyester polyurethane, of a polycarbonate or of a mixture thereof, the polyester being derived from a hydroxy carboxylic acid or from the corresponding lactone, and the catalyst is a sterically hindered bismuth compound wherein the composition is liquid at room temperature, wherein the isocyanate is a solid surface-deactivated isocyanate, and the isocyanate reactive compound is a diol or a higher functional polyol of a polyester polyurethane.

8. A composition according to claim 7 wherein the number average molecular weight of the polyester polyurethane is from 1500 Da to 3000 Da.

9. A composition according to claim 8 wherein the isocyanate reactive compound is a diol or a higher functional polyol of a polyester polyurethane which is obtainable by reacting a polycaprolactone diol or polyol with an asymmetric diisocyanate.

10. A composition according to claim 9 wherein the number average molecular weight of the polycaprolactone diol or polyol is from 500 Da to 1500 Da.

11. A composition according to claim 10 wherein the asymmetric diisocyanate is toluenediisocyanate or isophoronediisocyanate or a mixture thereof.

12. A composition according to claim 11 wherein the ratio of the hydroxy groups of the polycaprolactone diol or polyol to the isocyanate groups of the asymmetric diisocyanate is from 1.2 to 3.

13. A composition according to claim 12 wherein the ratio of the hydroxy groups of the polycaprolactone diol or polyol to the isocyanate groups of the asymmetric diisocyanate is from 1.5 to 2.5.

14. A process for preparing a heat-curable polyurethane reactive composition according to claim 2 comprising the consecutive steps a to c:
   a) providing a diol or a higher functional polyol of a polyester or a polycarbonate or a mixture thereof as an isocyanate reactive compound, the polyester being derived from a hydroxy carboxylic acid or from the corresponding lactone and being in its liquid form, and adding thereto a compound having at least two primary amino groups,
   b) adding a solid isocyanate, and
   c) adding a mixture comprising the isocyanate reactive compound and a sterically hindered bismuth-catalyst.

15. A process for preparing a heat-curable polyurethane reactive composition according to claim 7 comprising the consecutive steps a to c:
   a) providing a liquid diol or a higher functional polyol of a polyester polyurethane as an isocyanate reactive compound,
   b) adding a solid isocyanate, and
   c) adding a mixture comprising the isocyanate reactive compound and a sterically hindered bismuth-catalyst.

16. A process according to claim 15 wherein the number average molecular weight of the polyester polyurethane is from 1500 Da to 3000 Da.

17. A process according to claim 15 wherein the isocyanate reactive compound is a diol or a higher functional polyol of a polycaprolactone polyurethane.

18. A process according to claim 17 wherein after adding the solid isocyanate in step b) a mixture comprising the isocyanate reactive compound and the compound having two or more amino groups is added.

19. A process according to claim 18 comprising adding a polymeric primary triamine before adding the mixture comprising the isocyanate reactive compound and the sterically hindered bismuth-catalyst.

\* \* \* \* \*